M. BITSCHKUS.
TIRE COVER.
APPLICATION FILED JAN. 13, 1920.

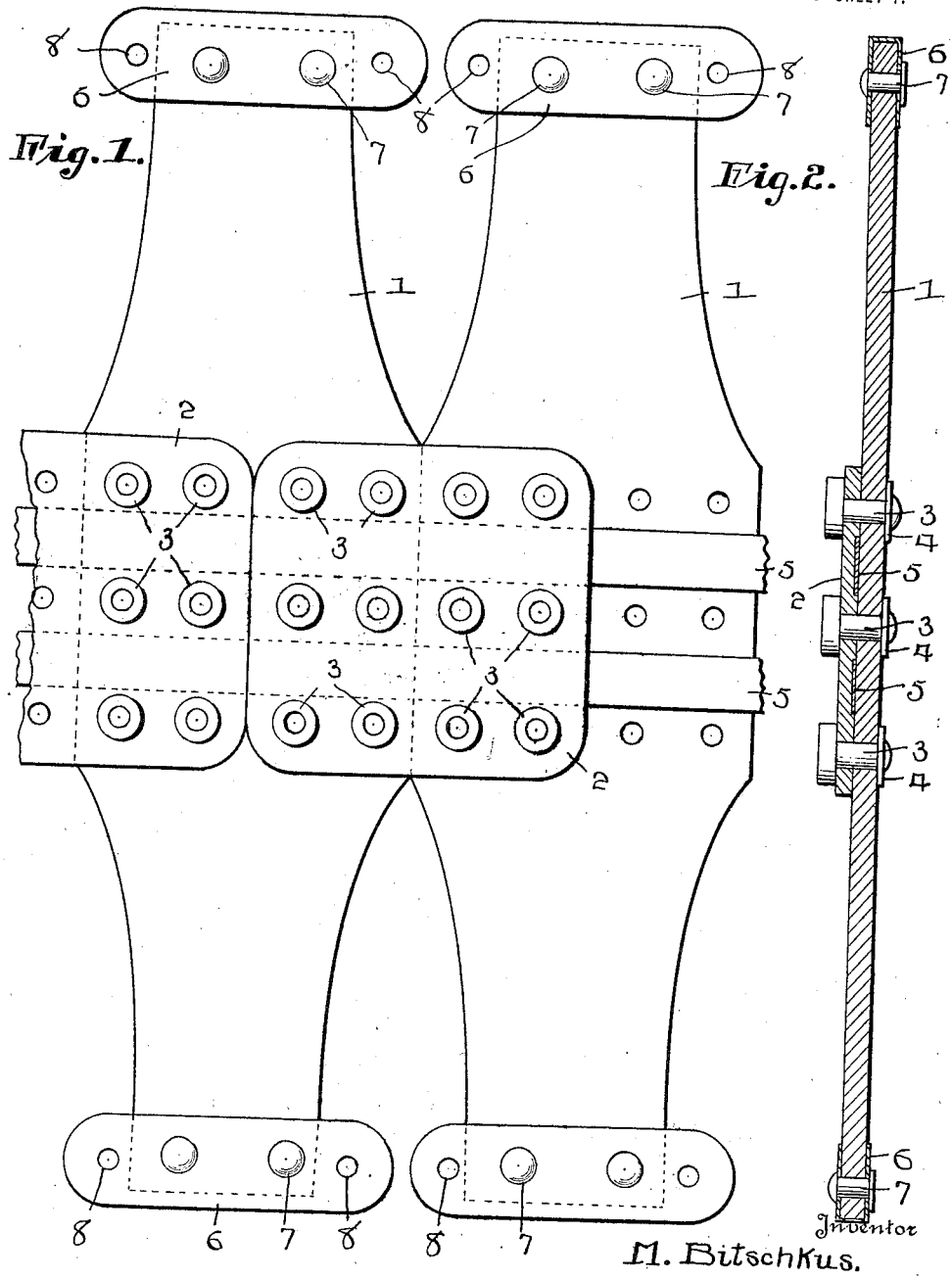

1,437,791.

Patented Dec. 5, 1922.
2 SHEETS—SHEET 2.

Inventor
M. Bitschkus.

By H. R. Kerslake.
Attorney

Patented Dec. 5, 1922.

1,437,791

UNITED STATES PATENT OFFICE.

MAXIMO BITSCHKUS, OF SANTIAGO, CHILE.

TIRE COVER.

Application filed January 13, 1920. Serial No. 351,232.

*To all whom it may concern:*

Be it known that I, MAXIMO BITSCHKUS, citizen of Germany, residing at Santiago, Chile, 677 Vergara Street, have invented new and useful Improvements in Tire Covers, of which the following is a specification.

This invention relates to improvements in protecting covers for motor vehicle tires and the object of the invention is to provide an improved casing designed to prevent skidding, to prevent puncture and to throw off mud from the wheels to which the casing is attached.

With the foregoing object outlined and with other objects in view which will appear as the description proceeds the invention consists of the novel features hereinafter described in detail, illustrated in the accompanying drawings and more particularly pointed out in the appended claim.

Referring to the drawings:—

Figure 1 is a plan view of a section of the casing, certain parts being removed and other parts being broken away for the purpose of clearance.

Figure 2 is a transverse sectional view of one of the cross straps of the improved protector.

Figure 5:
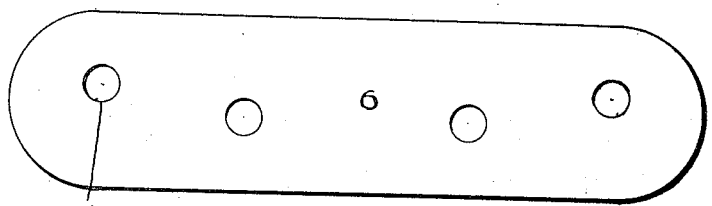
Figure 5 is a plan view of one of the end plates of the cross straps.
Figure 6:
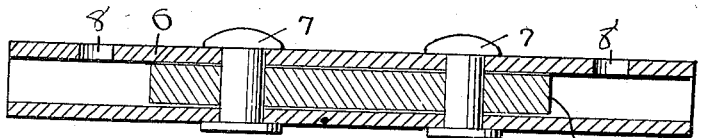
Figure 6 is a longitudinal sectional view of the same.
Figure 7:
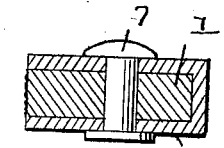
Figure 7 is a transverse sectional view of one of the end plates.
Figure 3:
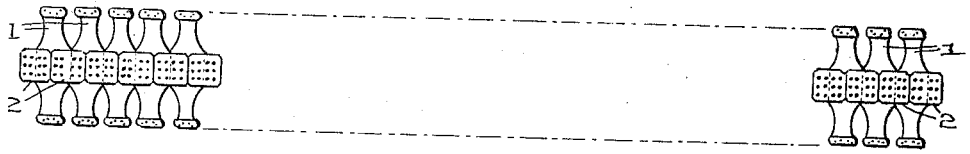
Figure 3 is a plan view of the cover on a reduced scale.
Figure 4:
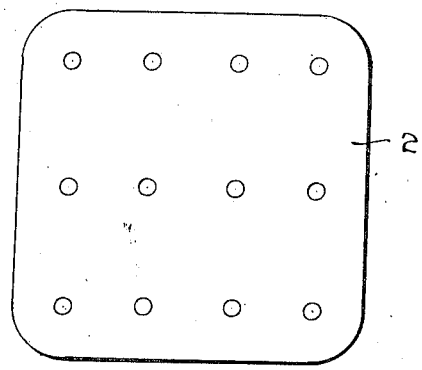
Figure 4 is a plan view of one of the connecting plates used in joining the cross straps.

In the drawing 1 represents cross straps, a series of which are arranged edge to edge to provide a cover and the central portions of said straps are of greater width than their end portions.

The cross straps are connected together by means of plates 2 which are fastened to the straps by means of the rivets 3 having heads 4, each plate 2 overlaps a plurality of adjacent straps as may be seen from the drawings.

Located between the straps and the plates 2 are a plurality of longitudinally extending steel strips 5 which act to prevent the straps from being pulled apart.

The ends of the straps are provided with protecting plates 6 which are of channel-shaped cross section and fastened to the straps by means of rivets 7. The end plates 6 are provided with apertures 8 designed to receive fastening means such as ropes or laces for securing the cover to a wheel.

It will be noted that the heads 4 of the rivets 3 are of slight thickness as these heads are designed to lie adjacent the tire casing, but the outer heads of the rivets are enlarged for the purpose of preventing skidding.

While I have illustrated and described the preferred embodiment of my invention, I am aware that various changes may be made in the construction shown without departing from the spirit of the invention as set forth by the claim.

What I claim and desire to secure by Letters Patent is:—

In a protecting cover for tire casings, a series of transversely arranged straps, means connecting said straps together, and channel shaped hinge plates connected to the ends of said straps, each hinge plate extending beyond the opposite side edges of the strap with which it is associated and said projecting ends being apertured to permit connection of the ends of a hinge plate to certain ends of adjacent hinge plates.

In testimony whereof I have signed my name to this specification in the presence of the subscribing witness.

MAXIMO BITSCHKUS.

Witness:
WALTER J. TINGLE.